United States Patent [19]

Detwiler et al.

[11] Patent Number: 5,459,308
[45] Date of Patent: Oct. 17, 1995

[54] DUAL APERATURE OPTICAL SCANNER

[75] Inventors: Paul O. Detwiler, New Concord; Barry M. Mergenthaler, Cambridge, both of Ohio

[73] Assignee: NCR Corporation, Dayton, Ohio

[21] Appl. No.: 357,341

[22] Filed: Dec. 15, 1994

Related U.S. Application Data

[63] Continuation of Ser. No. 64,292, Jul. 15, 1993, abandoned, which is a continuation of Ser. No. 767,746, Sep. 30, 1991, Pat. No. 5,229,588.

[51] Int. Cl.⁶ .................................................. G06K 7/10
[52] U.S. Cl. ......................... 235/467; 235/383; 235/462
[58] Field of Search .................................. 235/383, 457, 235/467, 462

[56] References Cited

U.S. PATENT DOCUMENTS

| | | |
|---|---|---|
| 3,774,014 | 11/1973 | Berler. |
| 3,818,444 | 6/1974 | Connell. |
| 4,018,504 | 4/1977 | Wu et al.. |
| 4,064,390 | 12/1977 | Hildebrand et al.. |
| 4,065,343 | 12/1977 | Stumpe. |
| 4,193,540 | 3/1980 | Dougados et al.. |
| 4,333,006 | 6/1982 | Gorin et al. ............................ 235/457 |
| 4,369,331 | 1/1983 | Swartz et al.. |
| 4,473,746 | 9/1984 | Edmonds. |

(List continued on next page.)

FOREIGN PATENT DOCUMENTS

| | | |
|---|---|---|
| 0360250 | 3/1990 | European Pat. Off.. |
| 0360249 | 3/1990 | European Pat. Off.. |
| 0412351 | 2/1991 | European Pat. Off.. |
| 0420643 | 4/1991 | European Pat. Off.. |
| 0444958 | 9/1991 | European Pat. Off.. |
| 52-002445 | 1/1977 | Japan. |
| 61-228584 | 10/1986 | Japan. |
| 63-192175 | 8/1988 | Japan. |
| 2-85983 | 3/1990 | Japan. |
| 2-83686 | 3/1990 | Japan. |
| 2-83681 | 3/1990 | Japan. |
| 3-218587 | 9/1991 | Japan. |
| 3-266195 | 11/1991 | Japan. |
| 3-265079 | 11/1991 | Japan. |
| 3-252889 | 11/1991 | Japan. |
| 3-252891 | 11/1991 | Japan. |
| 3-253811 | 11/1991 | Japan. |
| 3-257691 | 11/1991 | Japan. |
| 3-257692 | 11/1991 | Japan. |
| 3-271988 | 12/1991 | Japan. |
| 3-271987 | 12/1991 | Japan. |
| 3-271880 | 12/1991 | Japan. |
| 4-347783 | 12/1992 | Japan. |
| 1316985 | 5/1973 | United Kingdom. |
| 89/05013 | 6/1989 | WIPO. |

OTHER PUBLICATIONS

Hildebrand, A. P., "Generating Multi-Dimensional Scan Using A Single Rotating Component," *Laser Scanning Components & Techniques*, Proceedings of the Society of Photo-Optical Instrumentation Engineers, vol. 84, Aug. 24–25, 1976, San Diego, Calif., pp. 85–89.

*Laser Beam Scanning*, Marcel Dekker, Inc., New York, 1985, pp. 227–229.

(List continued on next page.)

*Primary Examiner*—Harold Pitts
*Attorney, Agent, or Firm*—Paul W. Martin

[57] ABSTRACT

A dual aperture optical scanner which employs a single laser beam to produce horizontal and vertical scan patterns. The optical scanner includes a housing having first and second apertures, a laser beam source, a mirrored spinner having a plurality of facets with different elevation angles for reflecting the laser beam in a plurality of directions, and a plurality of pattern mirrors within the housing for reflecting the laser beam from the spinner through the first and second apertures to an article having a bar code label to be scanned. The optical scanner also includes an optical transceiver for passing the laser beam and for collecting reflected light from the scanned article and a photodetector for generating signals representing the intensity of the light reflected from the article.

20 Claims, 6 Drawing Sheets

U.S. PATENT DOCUMENTS

| | | | |
|---|---|---|---|
| 4,560,862 | 12/1985 | Eastman et al. | 235/467 |
| 4,652,732 | 3/1987 | Nickl . | |
| 4,671,661 | 6/1987 | Ott . | |
| 4,713,532 | 12/1987 | Knowles | 235/467 |
| 4,762,984 | 8/1988 | Knowles et al. . | |
| 4,794,237 | 12/1988 | Ferrante | 235/457 |
| 4,799,164 | 1/1989 | Hellekson et al. | 235/467 |
| 4,851,667 | 7/1989 | Mergenthaler et al. | 250/236 |
| 4,861,973 | 8/1989 | Hellekson et al. | 235/467 |
| 4,872,062 | 10/1989 | Nanba . | |
| 4,939,355 | 7/1990 | Rando et al. | 235/467 |
| 4,960,985 | 10/1990 | Knowles | 235/467 |
| 4,999,482 | 3/1991 | Yang | 235/457 |
| 5,000,529 | 3/1991 | Katoh et al. | 235/467 |
| 5,019,694 | 5/1991 | Collins, Jr. | 235/383 |
| 5,025,477 | 6/1991 | Baitz et al. . | |
| 5,042,619 | 8/1991 | Kohno . | |
| 5,107,100 | 4/1992 | Shepard et al. . | |
| 5,128,520 | 7/1992 | Rando et al. . | |
| 5,148,009 | 9/1992 | Lindacher . | |
| 5,206,491 | 4/1993 | Katoh et al. | 235/467 |
| 5,239,169 | 8/1993 | Thomas . | |
| 5,256,864 | 10/1993 | Rando et al. . | |
| 5,266,788 | 11/1993 | Yamazaki et al. . | |
| 5,268,565 | 12/1993 | Katoh et al. | 235/467 |
| 5,272,322 | 12/1993 | Nishida et al. . | |
| 5,293,033 | 3/1994 | Yamashita . | |

OTHER PUBLICATIONS

Inderrieden, M. T., "Human Factors Study on the Benefits of Two Scanners Per Checklane," Sep. 11, 1987.

Itkin, S., "Bar Code Scanners: Development and Trends," Logistics Today, vol. 9, Issue 3, May–Jun. 1990, United Kingdom, pp. 29–30—Abstract Only.

Wu, Ps. S., et al., "Omnidirectional Laser Scanner for Supermarkets," SPIE, vol. 378, Laser Scanning and Recording, 1985, pp. 458–463.

1

DUAL APERATURE OPTICAL SCANNER

This is a continuation of application Ser. No. 08/064,292 filed on Jul. 15, 1993, now abandoned, which is a continuation of application Ser. No. 07/767,746, filed Sep. 30, 1991, now U.S. Pat. No. 5,229,588.

BACKGROUND OF THE INVENTION

The present invention relates to optical scanners and more specifically to a dual aperture optical scanner.

Optical scanners are well known for their usefulness in retail checkout and inventory control. Optical scanners generally employ a laser diode, the light from which is focused and collimated to produce a scanning beam. An optical transceiver directs the beam against a mirrored polygon or spinner and then against a plurality of stationary mirrors, and collects the beam after it is reflected by a bar code label. A motor rotates the mirrored polygon, and a detector receives the returning beam. The pattern produced by such a scanner is characterized by lines oriented at various angles to one another.

Typically, optical scanners emit light through one aperture, either horizontal or vertical, but not both. In high performance scanners, light is emitted from several directions through this aperture. In the case of horizontal apertures, a pattern of light is projected onto the front and bottom surfaces of a labelled item. In the case of vertical apertures, a pattern of light is projected onto the front and side surfaces of a labelled item. In low performance scanners, light illuminates only the surface which is facing the aperture.

Unfortunately, scanners having one aperture require item orientation to ensure that the bar code label is properly aligned in relation to the aperture. Orientation time slows item throughput and therefore customer throughput. Item orientation may also cause repetitive strain injury.

Therefore, it would be desirable to produce a high performance optical scanner having two scanning windows which illuminate the bottom and sides of a labeled item, thereby minimizing item orientation and increasing throughput.

SUMMARY OF THE INVENTION

In accordance with the teachings of the present invention, a dual aperture optical scanner is provided. The optical scanner includes a housing having first and second apertures, a laser beam source, a mirrored spinner for reflecting the laser beam in a plurality of directions, and a plurality of pattern mirrors within the housing for reflecting the laser beam from the spinner through the first and second apertures to an article having a bar code label to be scanned. Preferably, the first aperture is substantially horizontal and the second aperture is substantially vertical to maximize scan pattern coverage and to minimize required item orientation The optical scanner also includes an optical transceiver for passing the laser beam and for collecting reflected light from the scanned article and a photodetector for generating signals representing the intensity of the light reflected from the article.

It is a feature of the present invention that the mirrored spinner and pattern mirrors combine to produce a plurality of scan lines which pass through the horizontal and vertical apertures. The scanner produces a scan pattern which more effectively covers multi-sided articles than single aperture scanners. The mirrored spinner includes three facets which are oriented at different angles with respect to a predetermined reference. The pattern mirrors are flat and include a first set of mirrors for reflecting the laser beam from the spinner and a second set of mirrors for reflecting the laser beam from the first set of mirrors to the article. Preferably, the optical scanner produces twenty-four scan lines.

It is accordingly an object of the present invention to provide a dual aperture optical scanner.

It is another object of the present invention to provide a dual aperture optical scanner in which a first aperture is substantially vertical and a second aperture is substantially horizontal.

It is another object of the present invention to provide a dual aperture optical scanner which maximizes the illuminated surface area of an article to be scanned.

It is another object of the present invention to provide a dual aperture optical scanner which employs a single laser and motor.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
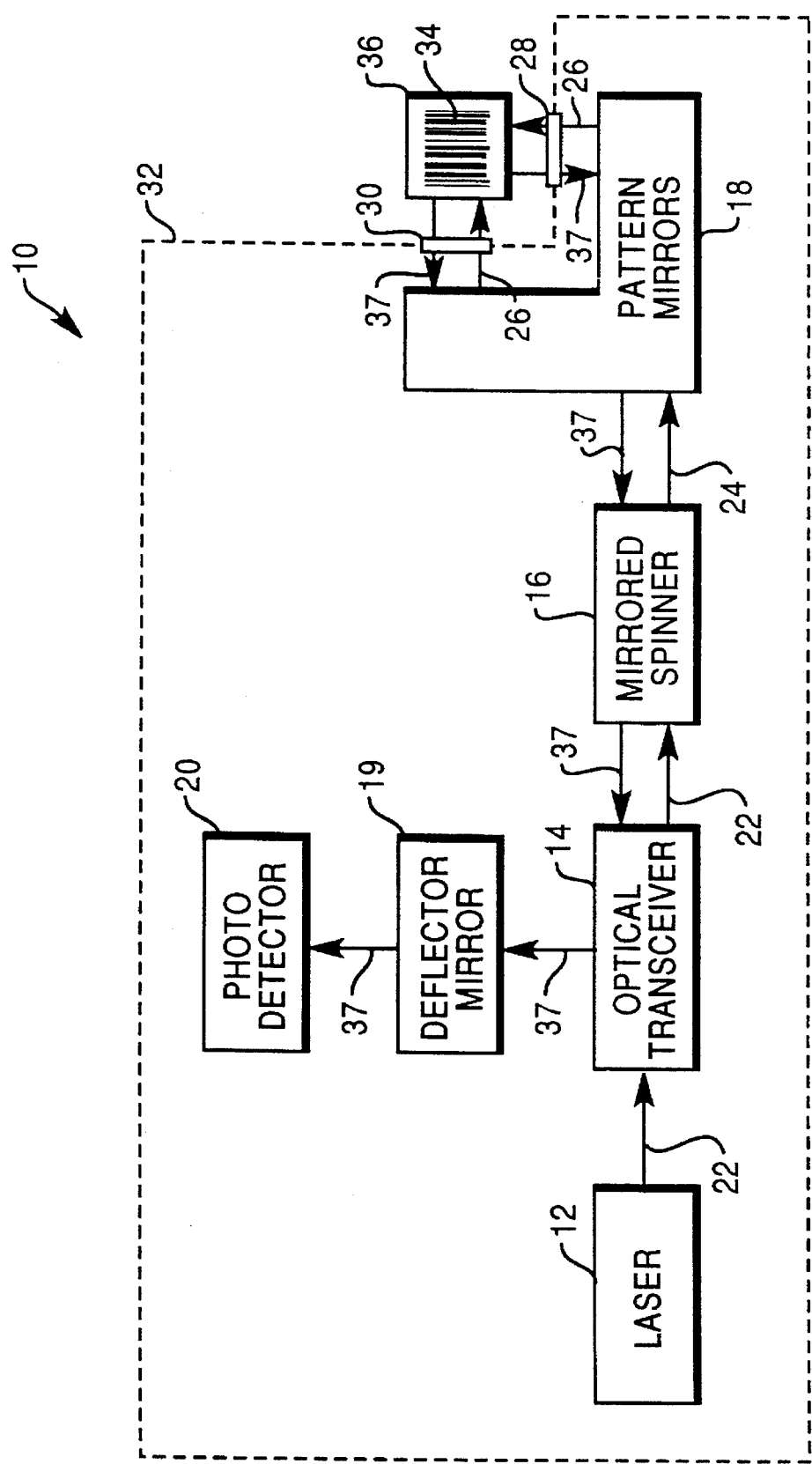
FIG. 1 is a block diagram of the dual aperture scanner of the present invention.

Referring now to FIG. 1, dual aperture optical scanner 10 of the present invention includes laser 12, optical transceiver 14, mirrored spinner 16, group 18 of pattern mirrors, deflector mirror 19, and photodetector 20. Laser 12 includes a laser diode, a focusing lens or lenses, and a collimating aperture. In the preferred embodiment, the laser diode emits visible light within a wavelength range of 670–690 nm and the collimating aperture and focusing lens produce a beam 22 having a beam waist of 220 microns in the center of the read zone.

Beam 22 passes through optical transceiver 14, which includes a mirrored collecting surface and an aperture for passing beam 22.

Beam 22 contacts mirrored spinner 16, which preferably has three planoreflective mirrored facets for producing scanning beams 24. Each facet has a slightly different elevation angle, which preferably differ by increments of about three degrees, resulting in three distinct scanning beam paths. The rotation of mirrored spinner 16 through an angle of about one-hundred-and-twenty degrees moves one facet completely through beam 22. Therefore, scanning beams 24 reflecting from mirrored spinner 16 cover an angle of about two-hundred-and-forty degrees and lie in a shallow cone.

Scanning beams 24 impact a group 18 pattern mirrors, which separate light from the facets of mirrored spinner 16 into a plurality of scan lines 26. In the preferred embodiment, group 18 of pattern mirrors split scanning beams 24 from each facet of mirrored spinner 16 into eight lines 26, resulting in twenty-four lines 26 for each complete revolution of mirrored spinner 16. Advantageously, all twenty-four lines 26 are produced by only one laser and motor.

It is a feature of scanner 10 of the present invention that some scan lines 26 pass through a substantially horizontal aperture 28 and some pass through a substantially vertical aperture 30 in scanner housing 32 on their way to bar code label 34 on article 36.

Reflected light 37 is redirected by group 18 of pattern mirrors towards spinner 16, which further directs it towards optical transceiver 14. Optical transceiver 14 directs and focuses reflected light 37 at deflector mirror 19, which further directs reflected light 37 towards photodetector 20. Photodetector 20 generates electrical signals representing the intensity of light 37.

Figure 2:
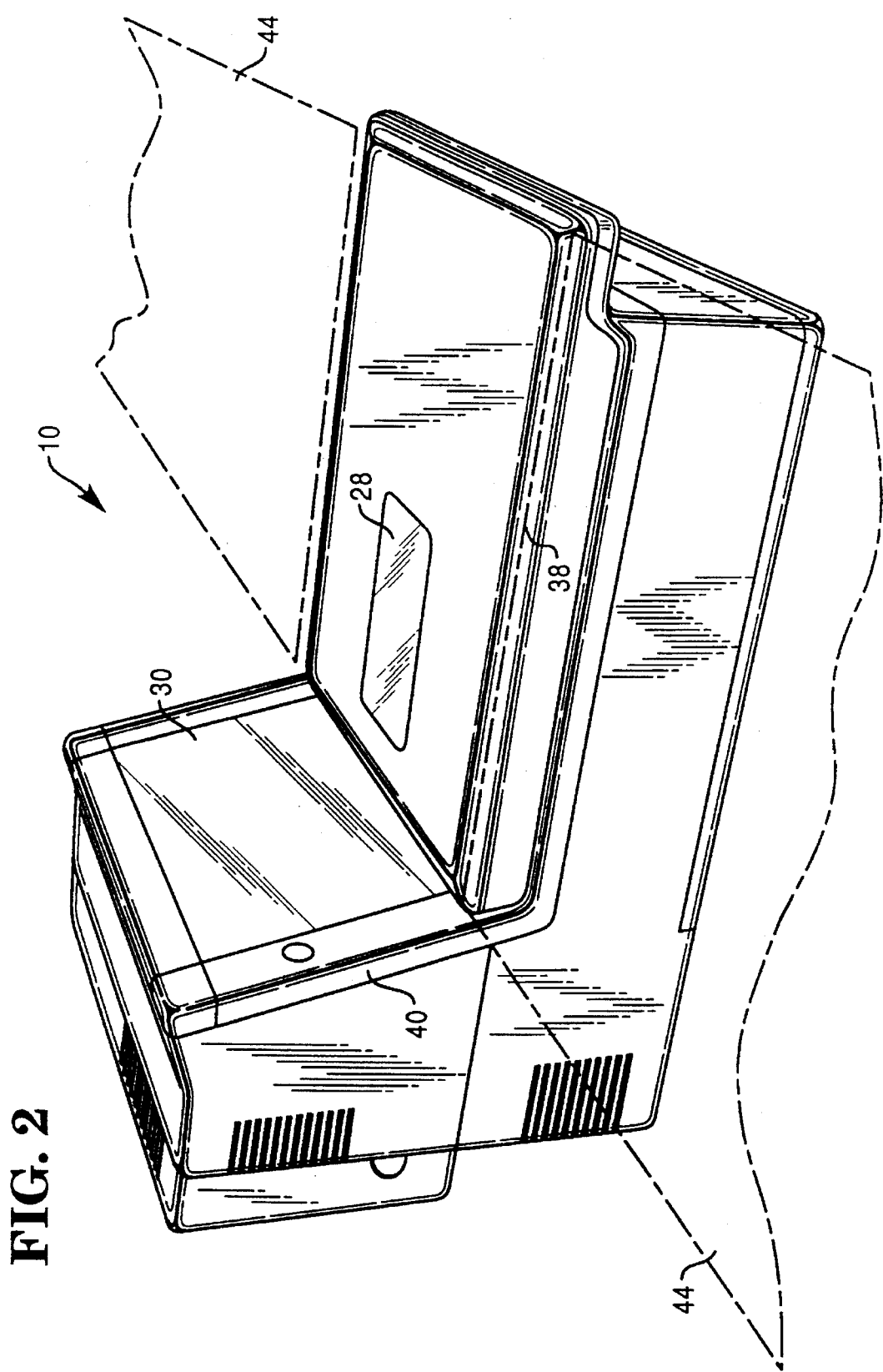
FIG. 2 is a exterior perspective view of the dual aperture scanner of the present invention.

Turning now to FIG. 2, apertures 28 and 30 are shown in more detail. Vertical aperture 30 is located within substantially vertical surface 40 and is large enough to illuminate a normal size item.

Horizontal aperture 28 is located within top surface 38 of housing 32 and is large enough to illuminate a normal size item. In this embodiment, vertical aperture 30 is larger than horizontal aperture 28.

Preferably, scanner 10 may be easily adapted to fit in a typical checkout counter 42. It is envisioned that top surface 38 be made substantially flush with the top surface 44 of counter 42.

Figure 3:
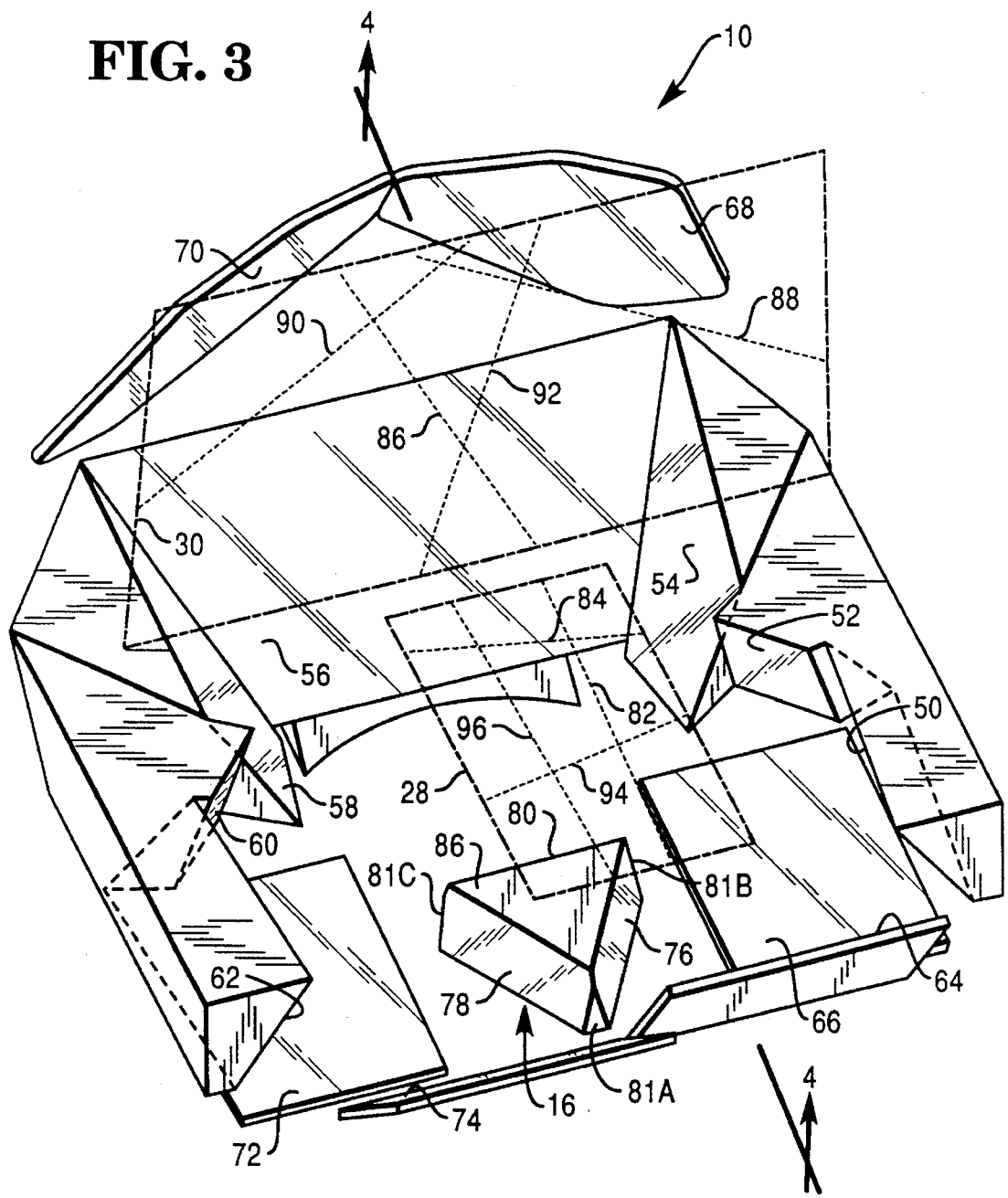
FIG. 3 is a interior perspective view of the dual aperture scanner of the present invention.
Figure 4:
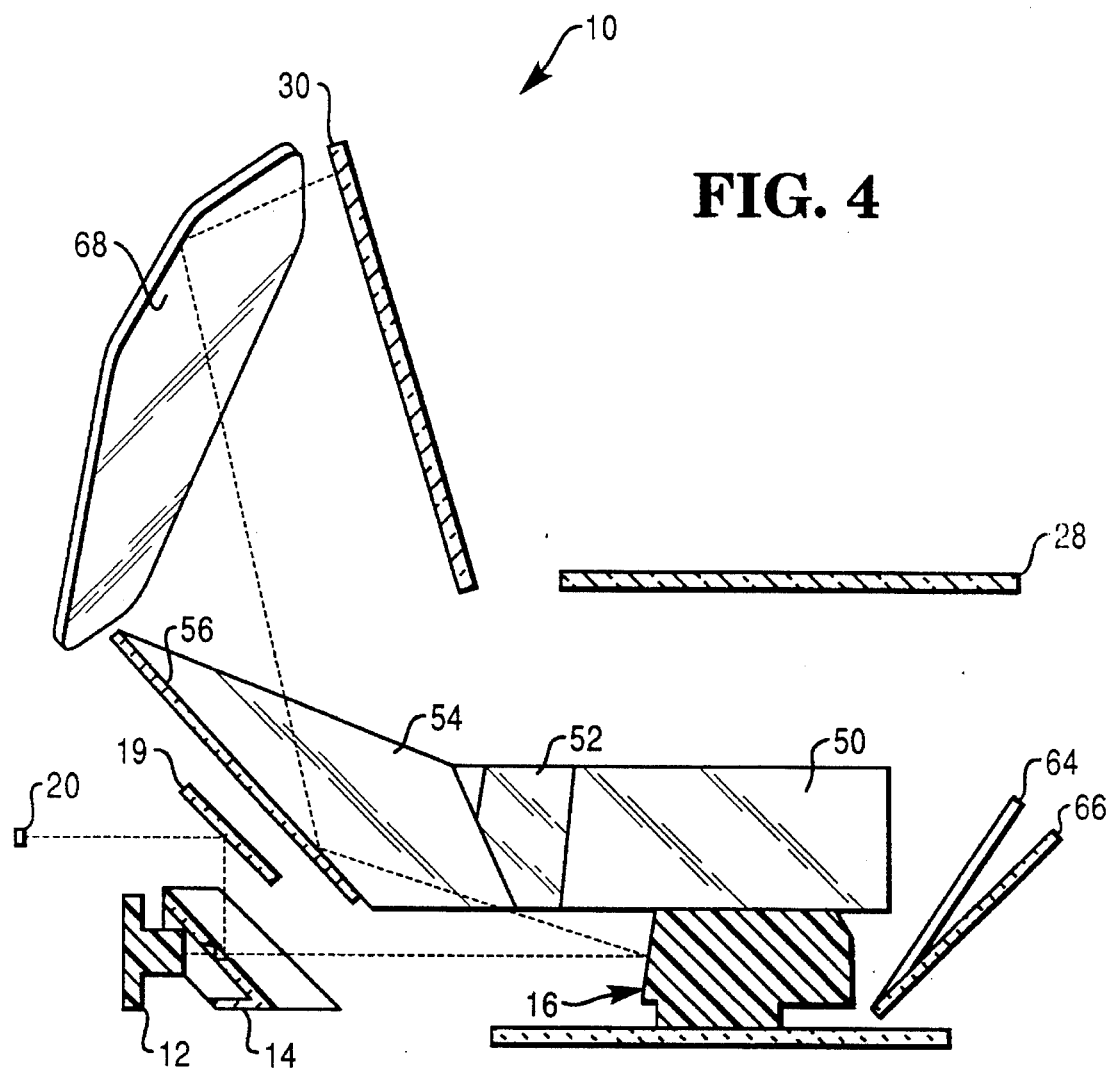
FIG. 4 is a sectional view of the dual aperture scanner of the present invention along lines 4—4 of FIG. 3.

Referring now to FIGS. 3 and 4, the arrangement of group 18 of pattern mirrors is shown in more detail. The pattern mirrors of group 18 are all flat mirrors. Scanning beams 24 from spinner 16 impact a first set of pattern mirrors 50–62 in group 18 in sequence and reflect therefrom to a second set of pattern mirrors 64–74 of group 18.

Figure 5:
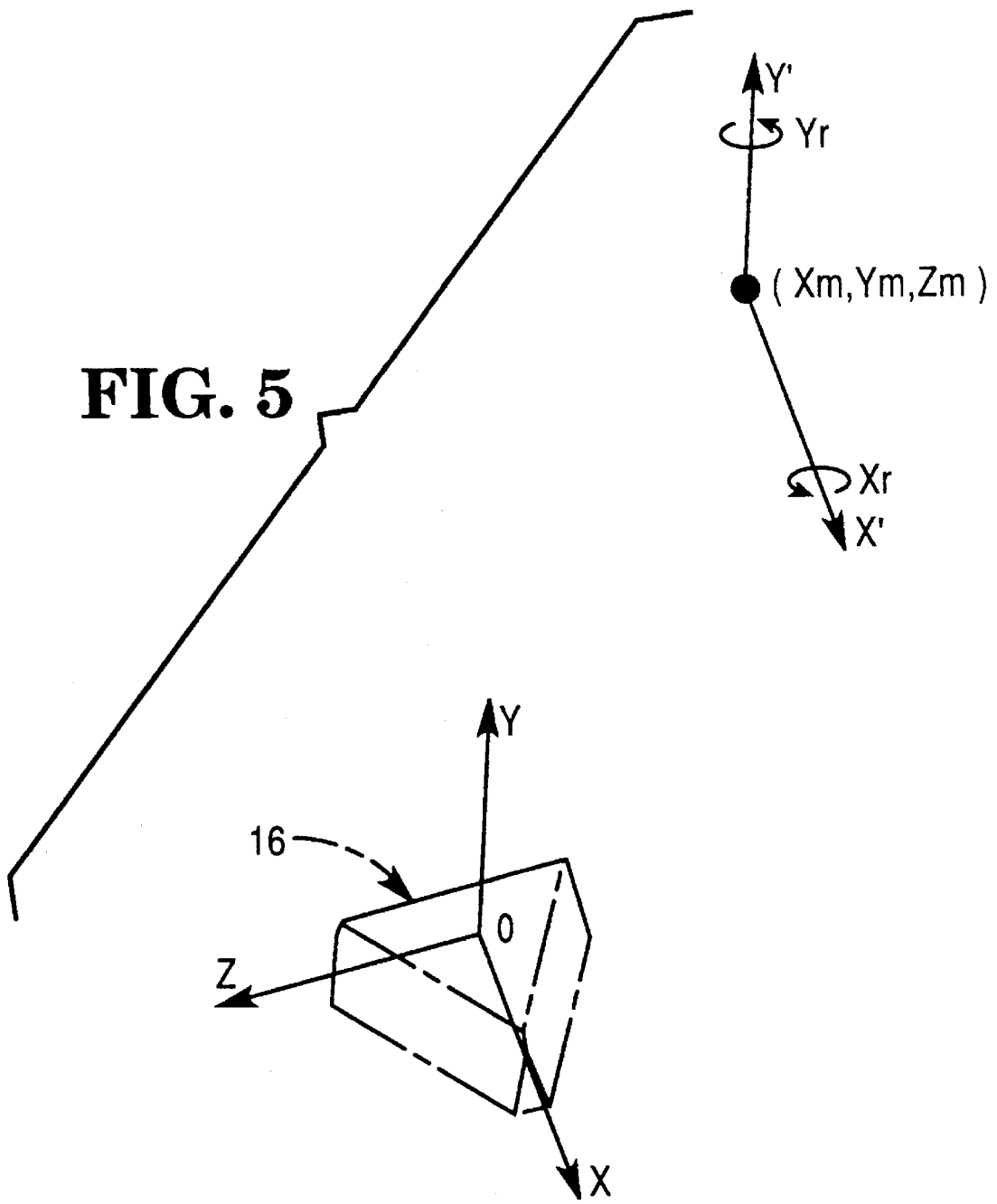
FIG. 5 is a view of a reference coordinate system for determining the location and orientation of a group of pattern mirrors within the dual aperture scanner of the present invention.

The reference coordinate system for pattern mirrors 50–74 is shown in FIG. 5 and includes X, Y, and Z axes. Coordinates Xm, Ym, and Zm are measured in inches, and angles Xr and Yr, are measured in degrees, with positive angles being measured in a counter-clockwise direction. To get to its final orientation, each mirror is first oriented parallel to the X-Y plane through a point (Xm, Ym, Zm). Each mirror is then rotated through an angle Xr about a line X' parallel to the X axis and containing the point (Xm, Ym, Zm). Each mirror is then rotated through an angle Yr about a line Y' parallel to the Y axis and containing the point (Xm, Ym, Zm). Origin O is at the center of spinner 16. These five values uniquely define the planes for mirrors 50–74. Preferred values are shown for each mirror in the following table:

| Mirror | Xm | Ym | Zm | Xr | Yr |
|---|---|---|---|---|---|
| 50 | −1.200 | 0.500 | −5.302 | 33.0 | −5.0 |
| 52 | −1.353 | 0.500 | −4.774 | 15.0 | 41.0 |
| 54 | −3.575 | 0.650 | −2.393 | −35.0 | 10.0 |
| 56 | −3.575 | 0.650 | 0.000 | −42.5 | 90.0 |
| 58 | −3.575 | 0.650 | 2.393 | −35.0 | 170.0 |
| 60 | −1.353 | 0.500 | 4.774 | 15.0 | 139.0 |
| 62 | −1.200 | 0.500 | 5.302 | 33.0 | −175.0 |
| 64 | 1.800 | −0.525 | −0.412 | −33.0 | −90.0 |
| 66 | 1.800 | −0.525 | −2.000 | −86.5 | 90.0 |
| 68 | −4.990 | 8.840 | 0.000 | 28.0 | 69.0 |
| 70 | −4.990 | 8.840 | 0.000 | 28.0 | 111.0 |
| 72 | 1.800 | −0.525 | 2.000 | −86.5 | 90.0 |
| 74 | 1.800 | −0.525 | −0.338 | −44.6 | −90.0 |

Beam 22 contacts planoreflective surfaces 76–80 of mirrored spinner 16. Each facet has a slightly different elevation angle, resulting in three distinct scanning beam paths. In the preferred embodiment, the elevation angles in degrees are 76.95, 79.00, and 81.05.

At the junction of the facets are interface surfaces 81A, B, and C, produced by rounding the edges between adjacent facets. In addition, the edges are cut back further at the bottom of spinner 16. Rounding serves to reduce the torque requirements for rotating spinner 16. At high motor operating speeds, wind resistance is a dominant component of motor torque. Thus, rounding serves to markedly reduce motor torque requirements, thereby facilitating the use of smaller and less expensive motors. Additionally, it reduces power consumption and heat dissipation.

In operation, laser beam 22 strikes each facet of mirrored spinner 16 in sequence. During the illumination of each facet, scanning beams 24 impact pattern mirrors 50–62 in sequence. First, light reflects from mirror 50 and then from mirror 66 to form scan line 82.

Second, light reflects from mirror 52 and then from mirror 64 as scan line 84.

Third, light reflects from mirror 54 and then from mirror 68 as scan line 86.

Fourth, light reflects from mirror 56 and then from mirror 68 as scan line 88.

Fifth, light reflects from mirror 56 and then from mirror 70 as scan line 90.

Sixth, light reflects from mirror 58 and then from mirror 70 as scan line 92.

Seventh, light reflects from mirror 60 and then from mirror 74 as scan line 94.

Eighth, light reflects from mirror 62 and then from mirror 72 as scan line 96.

The eight-step sequence above repeats itself for the two remaining spinner facets, yielding a total of twenty-four different scan lines 26.

Figure 7:
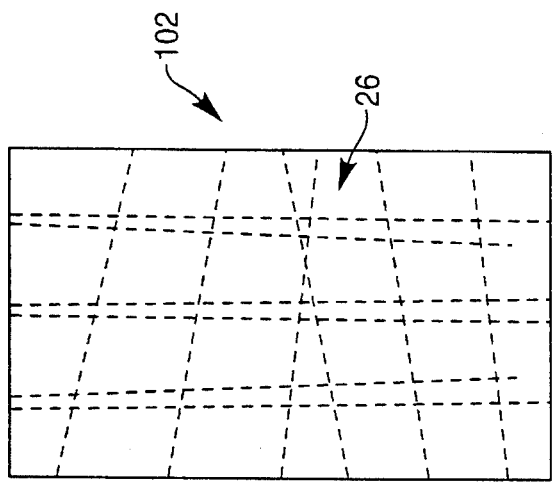
FIG. 7 is a plan view of the scan pattern emanating from a second aperture.
Figure 6:
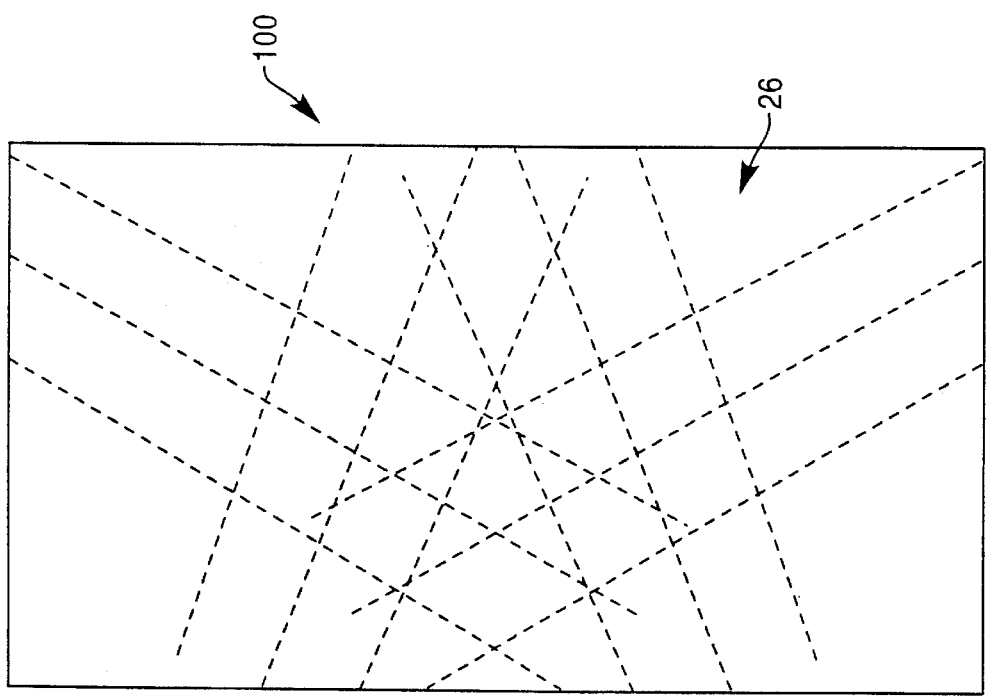
FIG. 6 is a plan view of the scan pattern emanating from a first aperture.

Referring now to FIGS. 6 and 7, vertical horizontal and scan patterns 100 and 102 are shown, including the eight scan lines of FIG. 3. Since each of the three facets of mirrored spinner 16 are inclined at different angles from one another, twenty-four different scan lines 26 are produced.

Although the invention has been described with particular reference to certain preferred embodiments thereof, variations and modifications of the present invention can be effected within the spirit and scope of the following claims.

What is claimed is:

1. A mirror assembly for use in an optical scanner having a substantially vertical aperture and a substantially horizontal aperture, comprising:

(a) a first set of pattern mirrors including at least primary and secondary mirrors, (b) a second set of pattern mirrors including at least primary and secondary mirrors, (c) each of the primary mirrors of the first set being disposed to receive an incident light beam at an oblique angle to reflect the incident beam onto at least one of the secondary mirrors of the first set, (d) each of the secondary mirrors of the first set being disposed at an oblique angle with respect to an incident light beam from at least one of the primary mirrors of the first set, and positioned to reflect the incident beam through said substantially vertical aperture, (e) each of the primary mirrors of the second set being disposed to receive an incident light beam at an oblique angle to reflect the incident beam onto at least one of the secondary mirrors of the second set, (f) each of the secondary mirrors of the second set being disposed at an oblique angle with respect to an incident light beam from at least one of the primary mirrors of the second set, and positioned to reflect the incident beam through said substantially horizontal aperture, (g) the primary mirrors of the first set including a generally trapezoidal mirror (56) and two side mirrors (54, 58), one on each side of the trapezoidal mirror, and (j) the secondary mirrors of the first set including first and second mirrors (68, 70), the first of which operates to receive a light beam from a first of said side mirrors of the first set of pattern mirrors and also from said trapezoidal mirror, and the second of which operates to receive a light beam from the second of said side mirrors of the first set of pattern mirrors and also from said trapezoidal mirror.

2. A mirror assembly for use in an optical scanner having a substantially horizontal aperture and a substantially vertical aperture, comprising:

(a) a first set of pattern mirrors including at least primary and secondary mirrors, (b) a second set of pattern mirrors including at least primary and secondary mirrors, (c) a source of light beams, (d) the primary mirrors of the first set being disposed at oblique angles with respect to an incident light beam from said source, to reflect the light beam onto the secondary mirrors of the first set, (e) the secondary mirrors of the first set being disposed at oblique angles with respect to an incident light beam from the primary mirrors of the first set, and positioned to reflect light through said substantially vertical aperture, (f) the primary mirrors of the second set being disposed at oblique angles with respect to an incident light beam from said source, to reflect light onto the secondary mirrors of the second set, (g) the secondary mirrors of the second set being disposed at oblique angles with respect to an incident light beam from the primary mirrors of the second set, and positioned to reflect light through said substantially horizontal aperture, (h) the primary mirrors of the first set including a centrally located mirror (56) and two side mirrors (54, 58), one on each side of the centrally located mirror, and (i) the secondary mirrors of the first set including two mirrors (68, 70), one of which receives a light beam from one of said side mirrors and from said centrally located mirror, and the other of which receives a light beam from the other of said side mirrors and from said centrally located mirror.

3. An optical scanner for scanning the surfaces of an object by means of light beams from a substantially vertical aperture and a substantially horizontal aperture, comprising:

(a) a housing having said substantially vertical and horizontal apertures, (b) a rotating mirror polygon positioned at a predetermined location within an area in said housing, (c) at least first and second sets of pattern mirrors located within the housing along the periphery of said area, (d) said first set of pattern mirrors being located in one region along said periphery, and having primary and secondary mirrors for reflecting light beams through said substantially vertical aperture, (e) said second set of pattern mirrors being located in a different region along said periphery, and having primary and secondary mirrors for reflecting light beams through said substantially horizontal aperture, (f) the primary mirrors of the first set including a generally trapezoidal mirror (56) and two side mirrors (54, 58), one on each side of the trapezoidal mirror, and (g) the secondary mirrors of the first set including at least two mirrors (68, 70) that receive light from said light source after it has been reflected from the primary mirrors of said first set, and operating to reflect light beams through said substantially vertical apertures.

4. An optical scanner as in claim 3, in which said rotating mirror polygon produces light beams that pass radially outward therefrom to scan the primary mirrors of the first set of pattern mirrors, one after another, and to scan the primary mirrors of the second set of pattern mirrors, one after another.

5. An optical scanner as in claim 3, in which said rotating mirror polygon reflects light beams onto the primary mirrors of said first and second sets of pattern mirrors as it rotates.

6. An optical scanner as in claim 3, in which said rotating mirror polygon reflects light onto the primary mirrors of said first and second sets of pattern mirrors.

7. A mirror assembly for use in an optical scanner having a substantially vertical aperture and a substantially horizontal aperture, comprising:

(a) a first set of pattern mirrors including at least primary and secondary mirrors, (b) a second set of pattern mirrors including at least primary and secondary mirrors, (c) a source of light, (d) the primary mirrors of the first set being disposed at oblique angles with respect to the source of light, to reflect the source of light onto the secondary mirrors of the first set, (e) the secondary mirrors of the first set being disposed at oblique angles with respect to incident light beams from the primary mirrors of the first set, and positioned to reflect the light beams through said substantially vertical aperture, (f) the primary mirrors of the second set being disposed at oblique angles with respect to the source of light, to reflect the source of light onto the secondary mirrors of the second set, (g) the secondary mirrors of the second set being disposed at oblique angles with respect to incident light beams from the primary mirrors of the second set, and positioned to reflect the light beams through said substantially horizontal aperture, and (h) the primary mirrors of the first set including a generally trapezoidal mirror (56) and two side mirrors (54, 58), one on each side of the trapezoidal mirror.

8. A mirror assembly as in claim 7, wherein (a) the secondary mirrors of the first set include first and second mirrors (68, 70), the first of which operates to receive a light beam from a first of said side mirrors of the first set of pattern mirrors and also from said trapezoidal mirror, and the second of which operates to receive a light beam from the second of said side mirrors of the first set of pattern mirrors and also from said trapezoidal mirror.

9. A mirror assembly as in claim 8 in which (a) the first side mirror and the first secondary mirror of the first set cooperate to produce a first scan line of light, (b) the trapezoidal mirror and the first secondary mirror of the first set cooperate to produce a second scan line of light that intersects the first scan line, (c) the trapezoidal mirror and the second secondary mirror of the first set cooperate to produce a third scan line of light, and (d) the second side mirror and the second secondary mirror of the first set cooperate to produce a fourth scan line of light that intersects the third scan line.

10. An optical scanner as in claim 7, in which (a) the source of light includes a rotating mirrored surface that directs light onto the primary mirrors of said first and second sets of pattern mirrors as it rotates.

11. An optical scanner as in claim 7, in which (a) the source of light includes a rotating polygon with mirrors on each its sides to reflect light onto the primary mirrors of said first and second sets of pattern mirrors.

12. A mirror assembly for use in a dual aperture optical scanner having a generally vertical aperture and a generally horizontal aperture, comprising:

a first plurality of pattern mirrors (54, 56, 58, 68, 70) positioned and angled relative to one another and positioned and angled relative to said generally vertical aperture, said first plurality of pattern mirrors including a set of primary mirrors (54, 56, 58) angled so as to reflect generally horizontal incident beams of light in a generally upward direction, said set of primary mirrors including a trapezoidal central mirror (56) and two side mirrors (54, 58) positioned on either side of said central mirror, said first plurality of pattern mirrors also including a set of secondary mirrors (68, 70) angled so as to reflect generally upwardly incident beams of light from said set of primary mirrors through said generally vertical aperture, said set of secondary mirrors including a right mirror (68) and a left mirror (70), and a second plurality of pattern mirrors positioned and angled relative to one another and positioned and angled relative to said generally horizontal aperture.

13. A mirror assembly for use in a dual aperture optical scanner having a first generally sidewardly inclined aperture and a second generally upwardly facing aperture, comprising:

a first plurality of pattern mirrors (54, 56, 58, 68, 70) positioned and angled relative to one another and positioned and angled relative to said generally sidewardly inclined aperture, said first plurality of pattern mirrors including a set of primary mirrors (54, 56, 58) angled so as to reflect generally horizontal incident beams of light in a generally upward direction, said set of primary mirrors including a central mirror (56) and two side mirrors (54, 58) positioned on either side of said central mirror, said first plurality of pattern mirrors also including a set of secondary mirrors (68, 70) angled so as to reflect generally upwardly incident beams of light from said set of primary mirrors through said first generally sidewardly inclined aperture, said set of secondary mirrors including a right mirror (68) and a left mirror (70), and a second plurality of pattern mirrors positioned and angled relative to one another and positioned and angled relative to said second generally upwardly facing aperture.

14. An L-shaped mirror assembly and housing having a first generally sidewardly inclined aperture and a second generally upwardly facing aperture, comprising:

an L-shaped housing having a shorter sidewardly inclined leg portion and a longer generally horizontal leg portion;

said sidewardly inclined aperture being located in a face of said shorter sidewardly inclined leg;

said generally upwardly facing aperture being located in a face of said longer generally horizontal leg portion;

a first plurality of pattern mirrors (54, 56, 58, 68, 70) positioned and angled relative to one another and positioned and angled relative to said generally sidewardly inclined aperture, said first plurality of pattern mirrors including a set of primary mirrors (54, 56, 58) angled so as to reflect generally horizontal incident beams of light in a generally upward direction, said set of primary mirrors including a central mirror (56) and two side mirrors (54, 58) positioned on either side of said central mirror, said first plurality of pattern mirrors also including a set of secondary mirrors (68, 70) positioned in said shorter sidewardly inclined leg portion and angled so as to reflect generally upwardly incident beams of light from said set of primary mirrors through said first generally vertical aperture, said set of secondary mirrors including a right mirror (68) and a left mirror (70), and a second plurality of pattern mirrors positioned and angled relative to to one another and positioned and angled relative to said second generally upwardly facing aperture.

15. A mirror assembly having first and second pluralities of pattern mirrors for producing scan patterns through a generally vertical aperture and a generally horizontal aperture, respectively, of a dual aperture optical scanner, said first plurality of pattern mirrors comprising:

a set of primary mirrors (54, 56, 58) angled so as to reflect generally horizontal incident beams of light in a generally upward direction, said set of primary mirrors including a trapezoidal central mirror (56) and two side mirrors (54, 58) positioned on either side of said central mirror, and said first plurality of pattern mirrors also including a pair of secondary mirrors (68, 70) substantially adjacent to each other and angled so as to reflect generally upwardly incident beams of light from said set of primary mirrors through said generally vertical aperture, said pair of secondary mirrors including a right mirror (68) and a left mirror (70).

16. A mirror assembly for use in a dual aperture optical scanner having a generally vertical aperture and a generally horizontal aperture, comprising:

a first plurality of pattern mirrors (54, 56, 58, 68, 70) positioned and angled relative to one another and positioned and angled relative to said generally vertical aperture, said first plurality of pattern mirrors including a set of primary mirrors (54, 56, 58) angled so as to reflect generally horizontal incident beams of light in a generally upward direction, said set of primary mirrors including a trapezoidal central mirror (56) and two side mirrors (54, 58) positioned on either side of said central mirror, said first plurality of pattern mirrors also including a pair of secondary mirrors (68, 70) substantially adjacent to each other and angled so as to reflect generally upwardly incident beams of light from said set of primary mirrors through said generally vertical aperture, said pair of secondary mirrors including a right mirror (68) and a left mirror (70), and at least a second plurality of pattern mirrors positioned and angled relative to one another and positioned and angled relative to said generally horizontal aperture.

17. A mirror assembly for producing scan patterns through a generally vertical aperture and a generally horizontal aperture, respectively, of a dual aperture optical scanner, said mirror assembly comprising first and second pluralities of pattern mirrors, for producing scan patterns through said generally vertical and horizontal apertures, respectively, wherein said first plurality of pattern mirrors includes a set of primary mirrors (54, 56, 58) angled so as to reflect generally horizontal incident beams of light in a generally upward direction, said set of primary mirrors including a trapezoidal central mirror (56) and two side mirrors (54, 58) positioned on either side of said central mirror, and said first plurality of pattern mirrors also includes a pair of secondary mirrors (68, 70) substantially adjacent to each other and angled so as to reflect generally upwardly incident beams of light from said set of primary mirrors through said generally vertical aperture, said pair of secondary mirrors including a right mirror (68) and a left mirror (70).

18. The mirror assembly of any one of claims 12, 13, 14, 15, 16 or 17 wherein said central mirror (56) is generally symmetrical about a vertical plane bisecting said central mirror and wherein each of said right mirror (68) and said left mirror (70) is generally shaped as a mirror image of the other with respect to said vertical plane.

19. The mirror assembly of any one of claims 12, 13, 14, 15, 16 or 17 further comprising a mirrored spinner, having three planoreflective mirrored facets, adapted to be rotated about a generally vertical axis.

20. A method of scanning an object by light beams that are projected through a substantially vertical plane and a substantially horizontal plane, comprising the steps of (a) directing light beams to primary mirrors of a first set of pattern mirrors, one after another, (b) directing light beams to primary mirrors of a second set of pattern mirrors, one after another, (c) reflecting the light beams from the primary mirrors of the first set of pattern mirrors onto secondary mirrors of said first set, and from the secondary mirrors through a transparent medium in said substantially vertical plane toward the path of an object, by reflecting the light beam from a first primary mirror (54) to a first secondary mirror (68), then from a second primary mirror (56) to the first secondary mirror (68), then from the second primary mirror (56) to a second secondary mirror (70), and then from a third primary mirror (58) to the second secondary mirror (70), and (d) reflecting the light beams from the primary mirrors of the second set of pattern mirrors onto secondary mirrors of the second set, and from the secondary mirrors of the second set through a transparent medium in said substantially horizontal plane toward the path of the object.

* * * * *